(12) United States Patent
Romp

(10) Patent No.: US 8,125,326 B2
(45) Date of Patent: Feb. 28, 2012

(54) INTELLIGENT VEHICULAR SPEED CONTROL SYSTEM

(76) Inventor: Greg Romp, Bragg Creek (CA)

(*) Notice: Subject to any disclaimer, the term of this patent is extended or adjusted under 35 U.S.C. 154(b) by 323 days.

(21) Appl. No.: 12/403,687

(22) Filed: Mar. 13, 2009

(65) Prior Publication Data

US 2010/0231373 A1 Sep. 16, 2010

(51) Int. Cl.
*B60Q 1/54* (2006.01)

(52) U.S. Cl. ........ 340/466; 340/458; 340/459; 340/460; 340/467; 340/468; 701/93; 701/117; 701/200

(58) Field of Classification Search .......... 340/458–467; 701/93, 117, 200
See application file for complete search history.

(56) References Cited

U.S. PATENT DOCUMENTS

| | | | |
|---|---|---|---|
| 3,532,986 | A | 10/1970 | Gelushia et al. |
| 3,775,743 | A | 11/1973 | Carter |
| 4,196,412 | A | 4/1980 | Sluis et al. |
| 4,401,181 | A | 8/1983 | Schwarz |
| 5,420,580 | A | 5/1995 | Rawls |
| 5,503,059 | A | 4/1996 | Pacholok |
| 6,008,740 | A | 12/1999 | Hopkins |
| 2003/0141990 | A1 | 7/2003 | Coon |
| 2003/0182026 | A1 | 9/2003 | Awada et al. |
| 2004/0225434 | A1* | 11/2004 | Gotfried ................ 701/200 |
| 2007/0050110 | A1 | 3/2007 | Kondoh et al. |
| 2007/0156296 | A1* | 7/2007 | Wright et al. ............. 701/13 |
| 2009/0076700 | A1* | 3/2009 | Radpour ................. 701/93 |
| 2009/0319163 | A1* | 12/2009 | Sutter et al. ............. 701/117 |

* cited by examiner

*Primary Examiner* — George Bugg
*Assistant Examiner* — Ojiako Nwugo
(74) *Attorney, Agent, or Firm* — Maxey Law Offices, PLLC; Stephen Lewellyn

(57) ABSTRACT

A method, system and computer program product for providing notification to the driver of a vehicle when the vehicle's speed exceeds the speed limit within a speed control zone. A vehicular speed control (VSC) utility retrieves information indicating the speed limit of the speed control zone from an information signal detected by a radio receiver. The receiver is electrically coupled to the speed sensor circuitry of the vehicle to track the vehicle's velocity. The VSC utility determines whether to activate a speed notification alarm by comparing the vehicle's velocity with the zone's speed limit. When the vehicle's velocity exceeds the speed limit of the speed control zone, the VSC utility triggers the alarm and alerts the driver of the excessive speed with an audible/visible notification. The VSC utility may re-trigger the alarm if the driver continues to exceed the speed limit while driving within close proximity of the speed control zone.

10 Claims, 6 Drawing Sheets

INTELLIGENT VEHICULAR SPEED CONTROL SYSTEM

FIELD OF THE INVENTION

The present invention generally relates to electronic speed control systems and in particular to electronic speed control systems and smart vehicles.

BACKGROUND OF THE INVENTION

Traffic safety measures have been traditionally used to enhance pedestrian safety. In an effort to help neighborhoods reduce speed problems especially around schools and playgrounds, various zone safety measures are implemented. These measures include the use of traffic lights, traffic signs, flashing lights, radar, cross walks as well as crossing guards in school zones and around playgrounds. Studies indicate that a substantial number of drivers continue to exceed the speed limit posted around school zones or playgrounds even when a zone safety measure is employed. Resolving the problem of motorists speeding through playground and school zones remains a critical issue, particularly when the speed limit through these zones is lower at certain times during the day when children are most active in and around these zones. A probable reason for excessive speeding in school zones and around playgrounds is a driver's lack of focus or attention to the surroundings. Furthermore, the driver may have generally become accustomed to ignoring traffic safety measures and may remain un-alerted by external speed signs. Thus, in order for traffic safety measures to address this critical issue of speeding, safety measures must be able to effectively re-focus a driver's attention to the driver's speed relative to the speed limits within the school or playground zone.

SUMMARY OF THE INVENTION

Disclosed are a method, a system and a computer program product for providing notification to a driver of a vehicle when the vehicle's speed exceeds the speed limit within a speed control zone. A vehicular speed control (VSC) utility retrieves information indicating the speed limit of the zone from an information signal detected by a radio receiver. The receiver is electrically coupled to the speed sensor circuitry of the vehicle to track the vehicle's speed. The VSC utility determines whether to activate a speed notification alarm by comparing the vehicle's velocity with the zone's speed limit. When the vehicle's velocity exceeds the speed limit of the zone, the VSC utility triggers the alarm and alerts the driver of the excessive speed with an audible/visible notification. The VSC utility may re-trigger the alarm if the driver continues to exceed the speed limit while driving within close proximity of the speed control zone.

The above as well as additional objectives, features, and advantages of the present invention will become apparent in the following detailed written description.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
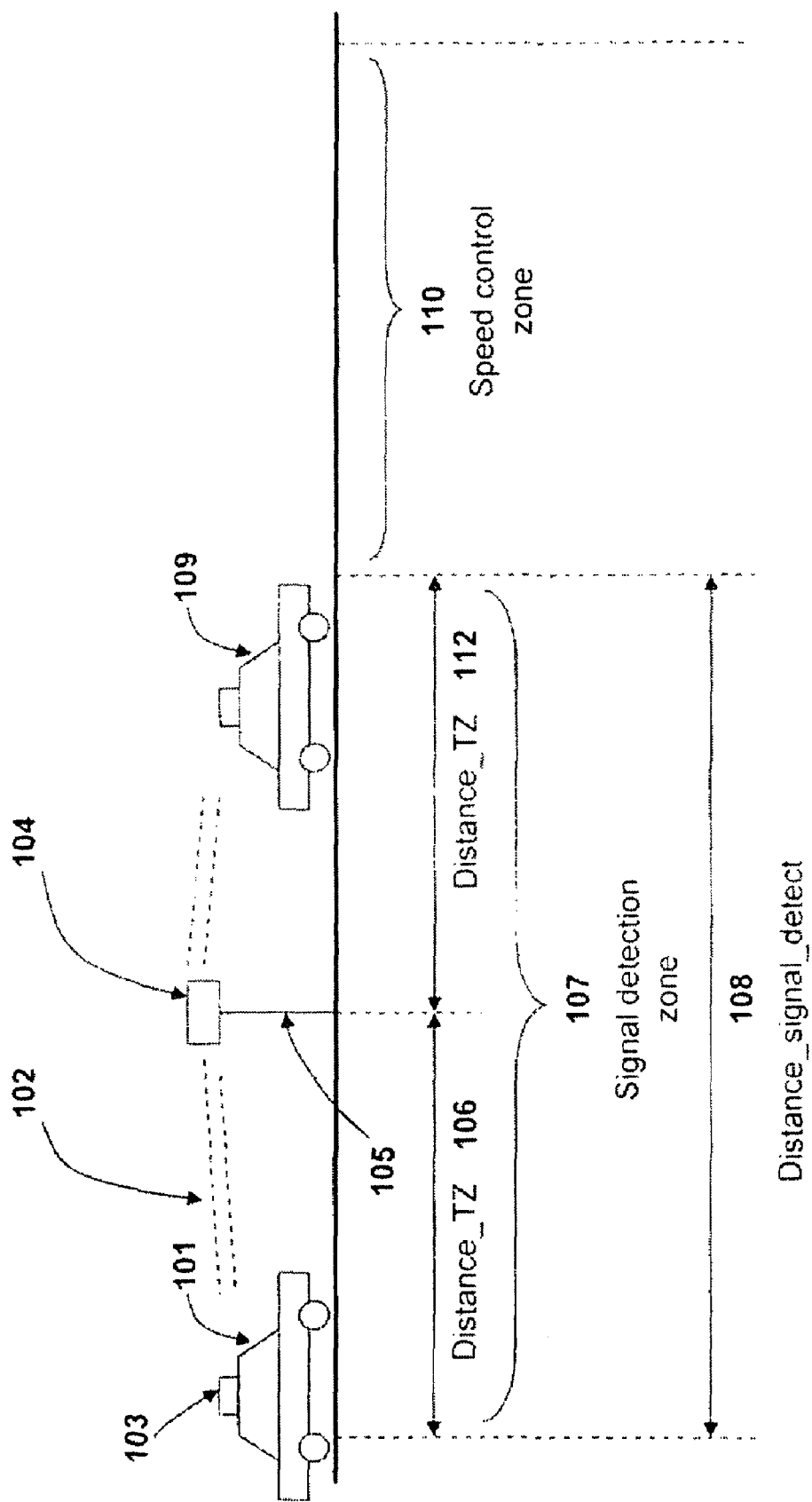
FIG. 1 depicts a vehicle, equipped with a radio receiver which is integrated into a speed control device, traveling towards a speed control zone, according to one embodiment.

The illustrative embodiments provide a method, system and computer program product for providing notification to a driver when a vehicle's speed exceeds the speed limit within a speed control zone. A vehicular speed control (VSC) utility retrieves information indicating the speed limit of the zone from an information signal detected by a radio receiver. The receiver is electrically coupled to the speed sensor circuitry of the vehicle to track the vehicle's speed. The VSC utility determines whether to activate a speed notification alarm by comparing the vehicle's velocity with the zone's speed limit. When the vehicle's velocity exceeds the speed limit of the zone, the VSC utility triggers the alarm and alerts the driver of the excessive speed with an audible/visible notification. The VSC utility may re-trigger the alarm if the driver continues to exceed the speed limit while driving within close proximity of the speed control zone.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and are not meant to imply any limitations on the invention. The invention may thus be implemented with different nomenclature/terminology utilized to describe the components/devices/parameters herein, without limitation. Each term utilized herein is to be given its broadest interpretation given the context in which the terms are utilized.

With reference now to the figures, and beginning with FIG. 1, there is depicted a vehicle, equipped with a receiver which is integrated into a speed control device, traveling towards a speed control zone, according to one embodiment. Speed Control System (SCS) 100 depicts a single vehicle at various time intervals as the vehicle travels towards the entrance of a speed control zone. In particular, the same vehicle is illustrated as first vehicle 101 at the entrance of the signal detection zone and as second vehicle 109 closer to the exit of the signal detection zone. The speed control zone may be a playground zone, a school zone, a work zone or some other zone having pedestrian traffic for which safety is of particular concern. SCS 100 comprises (first) vehicle 101 equipped with receiver 103. Receiver 103 is shown as an external device on the outside of vehicle 101 for ease of illustration. In actual implementation, receiver 103 may be integrated into the design and structure of vehicle 101. Furthermore, receiver 103 may be part of a collection of features and functionalities of vehicle 101 that enables vehicle 101 to be designated as a safe and intelligent vehicle.

Vehicle 101 detects information signal 102 transmitted by first transmitter 104 as vehicle 101 travels along a segment of a route leading into signal detection zone 107. First transmitter 104 is physically supported and positioned by post 105 which is installed/placed at a pre-determined distance (e.g., first distance_TZ 106) ahead of the location at which the vehicle (e.g., first vehicle 101) enters speed control zone 110. The location at which first transmitter 104 is positioned is determined by factoring the usual speed limit in the area and the speed limit in speed control zone 110. First transmitter 104 is positioned far enough in front of speed control zone 110 to permit vehicle 101 to receive signal 102 transmitted from transmitter 104 and to decelerate to the zone's speed limit before entering speed control zone 110. For example, if the posted speed limit is 45 miles per hour (mph) and the zone speed limit is 25 mph, transmitter 104 is placed a sufficient distance before the beginning of speed control zone 110 to permit vehicle 101 to safely slow down to the zone speed limit before entering speed control zone 110. In general, speed control zone 110 is visibly delineated. However, signal detection zone 107 is electronically defined. In one embodiment, speed control zone 110 may also be electronically defined to coincide with visible physical outlines of speed control zone 110.

Transmitter 104 sends information signal 102 to vehicle 101 via receiver 103 to warn the driver that vehicle 101 is about to enter speed control zone 110. The warning may be provided by visual notification (e.g., flashing text on a display) and/or an audible notification in the form of a buzzing sound or some other suitable audible warning. As vehicle 109 moves past transmitter 104, vehicle 109 remains within signal detection zone 107 for a distance illustrated as second distance_TZ 112. If vehicle 109 has not slowed down to the speed limit of speed control zone 110 by the time vehicle 109 enters speed control zone 110, the warning continues until vehicle 109 slows down to the speed limit of speed control zone 110, while vehicle 109 is located in speed control zone 110.

Figure 2:
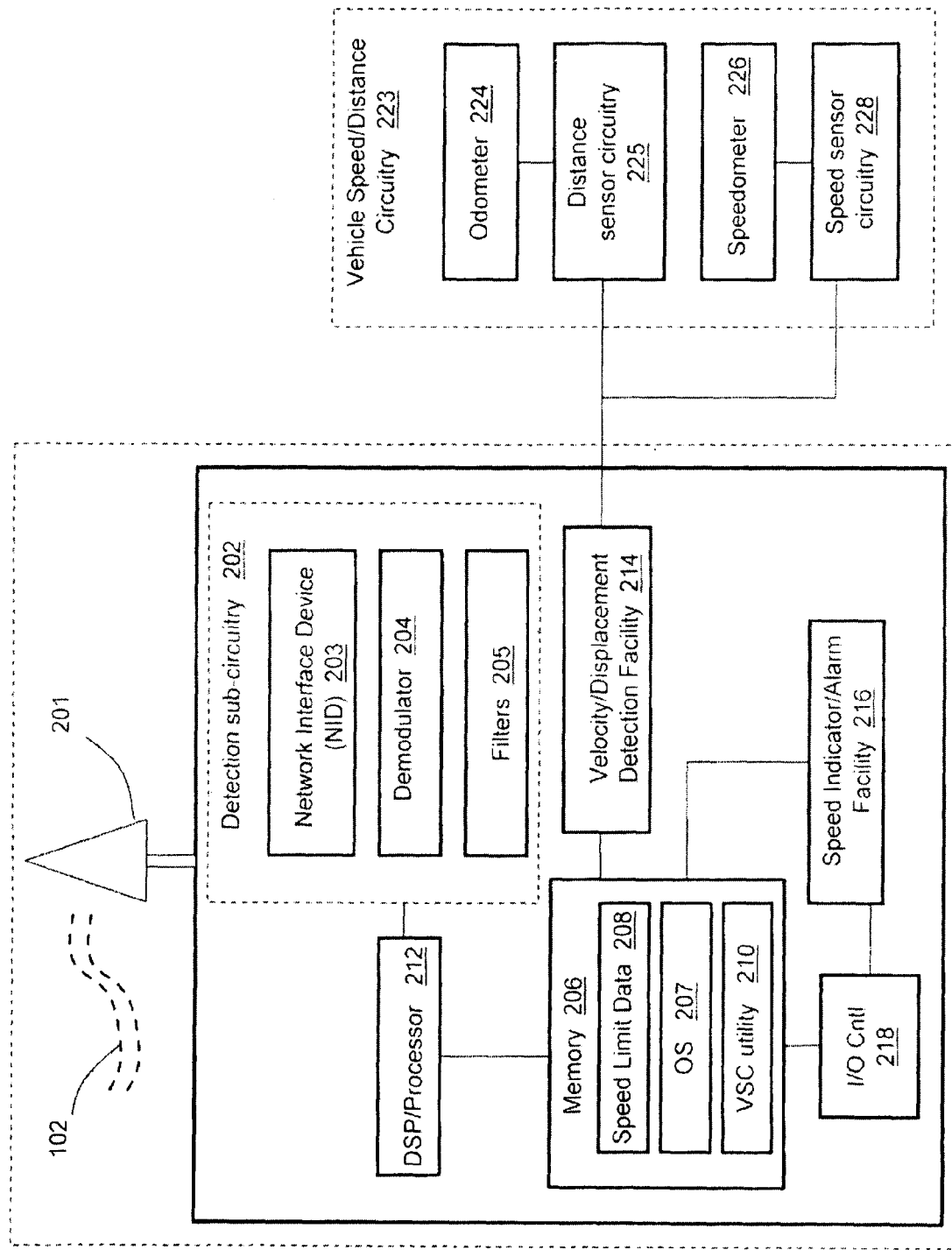
FIG. 2 illustrates an intelligent speed control system, according to one embodiment.

With reference now to FIG. 2, an intelligent speed control system is illustrated, according to one embodiment. Speed Control System (SCS) 200 comprises intelligent receiver 103, which is adapted to receive information signal 102 from first (radio) transmitter 104 (explicitly shown in FIG. 1). Intelligent receiver 103 is able to receive information signal 102 by using detection sub-circuitry 202 which includes Network Interface Device (NID) 203, demodulator 204 and filters 205. NID 203 enables receiver 103 to connect to an external network. In addition, antenna 201 enables detection of information signal 102 from radio transmitter 104. Intelligent receiver 103 also comprises memory 206 which is coupled to DSP/Processor 212. Memory 206 is also connected to Velocity/Displacement detection facility 214. Memory 206 is also connected to I/O controller 218 which provides connectivity and control for input devices and/or output devices. For example, I/O controller 218 is connected to output device, speed indicator/alarm facility 216. SCS 200 also comprises Speed/Distance sub-circuitry 223. Speed/Distance sub-circuitry 223 further comprises odometer 224 which is electrically coupled to distance sensor circuitry 225. Speed/Distance sub-circuitry 223 also includes speedometer 226 which is electrically coupled to speed sensor circuitry 228. Intelligent receiver 103 is connected to vehicle speed/distance sub-circuitry 223 via Velocity/Displacement detection facility 214 which is electrically coupled to vehicle speed/distance sub-circuitry 223. In particular, Velocity/Displacement detection facility 214 is electrically coupled to both distance sensor circuitry 225 and Speed sensor circuitry 228.

In addition to the above described hardware components of SCS 200, various features of the invention are completed/supported via software (or firmware) code or logic stored within memory 206 or other storage and executed by Processor/DSP 212. Thus, for example, illustrated within memory 206 are a number of software/firmware/logic components, including operating system (OS) 207, speed control data 208 and vehicular speed control (VSC) utility 210. In actual implementation, VSC utility 210 may be combined with speed control data 208 to provide a single executable component, collectively providing the various functions of each individual software component when the corresponding combined code is executed by Processor 212. For simplicity, VSC utility 210 is illustrated and described as a stand alone or separate software/firmware component, which provides specific functions, as described below.

CPU 212 executes VSC utility 210 and supports the user interface features of VSC utility 210. In the described embodiment, VSC utility 210 generates/provides several graphical user interfaces (GUI) to enable user interaction with, or manipulation of, the functional features of VSC utility 210. Certain functions supported and/or implemented by VSC utility 210 utilize processing logic executed by processor 212 and/or device hardware to complete the implementation of that function. For simplicity of the description, the collective body of code that enables these various functions is referred to herein as VSC utility 210. Among the software code/instructions/logic provided by VSC utility 210, and which are specific to the invention, are: (a) code/logic for retrieving information indicating the speed limit of a speed control zone from an information signal detected by a radio receiver; (b) code/logic for comparing a vehicle's velocity with the speed limit of the speed control zone; (c) code/logic for triggering a speed notification alarm with an audible/visible notification, when the vehicle's velocity exceeds the speed limit of the speed control zone; and (d) code/logic for re-triggering the notification alarm if the driver continues to exceed the speed limit while driving within close proximity of the speed control zone. According to the illustrative embodiment, when Processor 212 executes VSC utility 210, SCS 200/Receiver 103 initiates a series of functional processes that enable the above functional features as well as additional features/functionality. These features/functionality are described in greater detail below within the description of FIGS. 2-6.

Those of ordinary skill in the art will appreciate that the hardware components and basic configuration depicted in FIG. 2 may vary. The illustrative components within SCS 200 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

SCS 200 enables an operator of vehicle 101 traveling along a particular segment of a route to receive electronic notification of speed limits and warnings/alarms if the vehicle's speed exceeds the current/relevant speed limit. As vehicle 101 enters signal detection zone 107 while approaching speed control zone 110, intelligent receiver 103 detects information signal 102 which is transmitted by first transmitter 104. Information signal 102 includes speed control data 208 which comprises: (a) speed limit data; (b) length of speed control zone; (c) length of signal detection zone; and (d) transmitter identification (id). First transmitter 104 uses a schedule of operation within speed control data 408 (explicitly shown in FIG. 4) to enable first transmitter 104 to transmit the appropriate information signal at the appropriate intervals. For example, in Canada and the United States, playground zones are in effect throughout the week and school zones are in effect typically in during transit times when children are arrival to school in the morning, and leaving from school in the afternoon. First transmitter 104 inspects the time and initiates signal transmission only during the hours provided by the schedule of operation corresponding to a playground zone or school zone. In the Canadian example, first transmitter 104 does not initiate transmission of any signal on the evenings or weekends, according to the schedule of operation.

First transmitter 104 is placed at a location within signal detection zone 107 to enable efficient detection of the information signal by mobile receiver 103 within signal detection zone 107. Efficient detection of information signal 102 is enabled if the level of power of the propagating information signal exceeds a threshold value, within signal detection zone 107. In addition, the signal is preferably directed towards vehicles traveling towards the speed control zone. Furthermore, the location of first transmitter 104 enables a vehicle traveling at a predetermined "maximum speed" to decelerate to the pre-determined zone speed limit within a preset interval of time. In one embodiment, first transmitter 104 factors the usual speed limit in the area, trends in the observed traffic congestion level and speed trends at the corresponding route to determine values for the predetermined "maximum speed" and the preset interval of time. These values may be provided by manual or automatic processes. In one embodiment, first transmitter 104 electronically enables dynamic resizing of the signal detection zone and/or speed control zone for various speed limits, from a single physical location of transmitter 104. For example, a particular control zone for a park/playground may be expanded to accommodate a major (one-time) event at the park. In addition, speed limit is lowered from the usual level of 25 miles per hour (mph) to a limit of 15 mph. As a result, the signal detection zone is expanded to provide drivers/vehicles with earlier warning to allow them to decelerate to accommodate the modified/lower speed limit. First transmitter 104 electronically expands the speed control zone to accommodate safety for the relatively larger crowd. This electronic expansion may be accompanied by a physical/visible expansion using visible markers or indicators of the current dimensions of the speed control zone. In one embodiment, first transmitter 104 expands the control zone by modifying an adjustable power level of the transmitted signal. The power level may be adjusted to discrete power levels within a preset power range (as described in FIG. 4).

Following detection of information signal 102, VSC utility 210 records one or more of: (a) the time of detection of the information signal; (b) a first identification (id) of the first transmitter; and (c) an odometer reading at the time of the initial detection. In addition, VSC utility 210 determines a first velocity of vehicle 101 coupled to receiver 103. VSC utility 210 compares the first velocity of vehicle 101 to the retrieved (zone) speed limit to determine whether to activate speed notification alarm (SNA) 216. If the first velocity of vehicle 101 exceeds the zone speed limit, SNA 216 is triggered.

The triggering of SNA 216 is provided by one or more of: (a) an audible notification; and (b) visual notification. The audible notification is provided by one or more of: (a) a buzzing sound; (b) a voice message; and (c) other suitable audible notification. The visual notification is provided by one or more of: (a) text or graphics on a display panel; (b) flashing of text; and (c) other highlight mechanism to focus the driver's attention on the warning. The warning indicates to the driver that vehicle 101 is about to enter speed control zone 107 and the current speed of vehicle 101 exceeds the speed limit of speed control zone 107. VSC utility 210 provides a notification on one or more of: (a) a dedicated display or audio component of SNA 216; and (b) a shared/auxiliary display component or shared/auxiliary audio component to which SNA 216 connects via a wired or wireless network connection.

After a preset interval, VSC utility 210 determines whether the vehicle has arrived at the entrance of the speed control zone. Further discussion of the features and functionality of VSC utility 210 and SCS 200 is facilitated with the illustration of FIG. 3.

Figure 3:
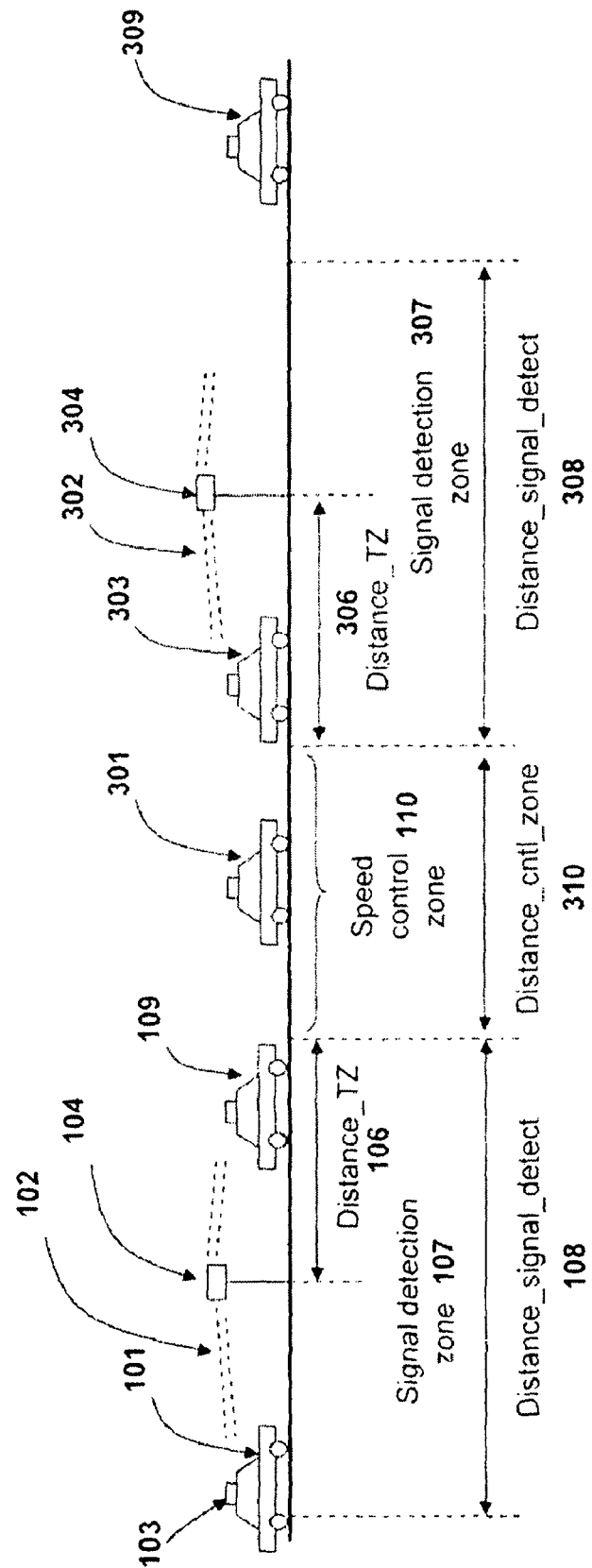
FIG. 3 illustrates a speed control system depicting a pair of transmitters positioned ahead of the entrance and after the exit of the speed control zone, respectively, according to one embodiment.

Turning now to FIG. 3, a speed control system depicting a pair of transmitters positioned "ahead" of the entrance and "after" the exit of the control zone, respectively, is illustrated, according to one embodiment. A first transmitter placed "ahead" of the control zone entrance allows a moving vehicle to encounter the first transmitter before reaching the zone entrance. A second transmitter placed "after" the control zone exit allows a moving vehicle to encounter the second transmitter after exiting the control zone. SCS 300 provides an expanded view of SCS 100 (FIG. 1).

VSC utility 210 determines whether vehicle 101 advances beyond the entrance of the speed control zone from one or more of: (a) detection of a sub-threshold power level of information signal 102, which power level is measured at one or more pre-set time intervals; (b) vehicle displacement measured by odometer readings; and (c) comparisons of vehicle displacement with the length of speed control zone 110 and the length of signal detection zone 107. In one embodiment, VSC utility 210 determines the vehicle's displacement from a first odometer reading when information signal 102 is first detected. VSC utility 210 also determines the current odometer reading. VSC utility 210 then obtains the vehicle's displacement from the difference of the first odometer reading and the current odometer reading. If the vehicle's displacement exceeds the combined length of the speed control zone and the signal detection zone, VSC utility 210 obtains an indication that the vehicle (e.g., vehicle 301) has entered speed control zone 110. In another embodiment, VSC utility 210 may obtain indication that the vehicle has entered speed control zone 110 when the currently detected power level falls below a threshold value, within a preset interval from the time of a previous reading that exceeded the threshold power level.

When vehicle 101 advances beyond the entrance of speed control zone 110, VSC utility 210 records a time corresponding to receipt of a first indication that vehicle 301 is located within speed control zone 110. However, when vehicle 101 has not arrived at the entrance of speed control zone 110, VSC utility 210 determines a current velocity of vehicle 101. When the current velocity is greater than the zone speed limit: (a) VSC utility 210 activates SNA 216, if SNA 216 is not already activated; or (b) VSC utility 210 maintains an activated state of SNA 216, if SNA 216 is currently activated. When the current velocity is not greater than the zone speed limit: (a) VSC utility 210 de-activates SNA 216; or (b) VSC utility 210 maintains a de-activated state of SNA 216.

Following a pre-determined interval, VSC utility 210 determines whether vehicle 301 advances beyond an exit of speed control zone 110 by one or more of: (a) comparisons of vehicle displacement with the length of speed control zone 110 (e.g., Distance_cntl_zone 310) and the length of signal detection zone 307 (e.g., Distance_signal_detect 308); and (b) detection of a second information signal (e.g., information signal 302) which is transmitted by a second transmitter (e.g., second transmitter 304) and identified by a second transmitter identification.

VSC utility 210 obtains indication that the vehicle has advanced past the signal detection zone and away from all transmitters of SCS 300 when receiver 103 within vehicle 309 is no longer able to detect any relevant information signal or by indications provided by odometer readings. Following an advance of vehicle 309 past the exit of speed control zone 110 and beyond second signal detection zone 307, VSC utility 210 replaces all retrieved information and computed values by preset reset values.

In general, speed control zone 110 is visibly delineated. However, signal detection zone 107 is electronically defined. In one embodiment, speed control zone 110 may also be electronically defined to coincide with visible physical outlines of speed control zone 110. For example, speed control zone 110 may be electronically defined as the space between first signal detection zone 107 and second signal detection zone 307. Furthermore, an electrically defined speed control zone is a way of providing indication to receiver 103 of the zone location of vehicle 101. For example, the zone location may be electronically identified as one of the following: (a) first signal detection zone 107; (b) speed control zone 110; and (c) second signal detection zone 307. For example, the location of vehicle 101 is identified as first signal detection zone 107 when receiver 103 detects a first information signal (above threshold power level) from a first transmitter identified by id. In speed control zone 110, a signal may not be detected. In second signal detection zone, the information signal is received from the second transmitter of a pair of transmitters.

The design of SCS 300 enables the information signals to be transmitted with controlled signal directivity and signal strength selectivity. Features and functionality of SCS 300 that enable controlled signal directivity and signal strength selectivity are further described using the illustration of FIG. 4.

Figure 4:
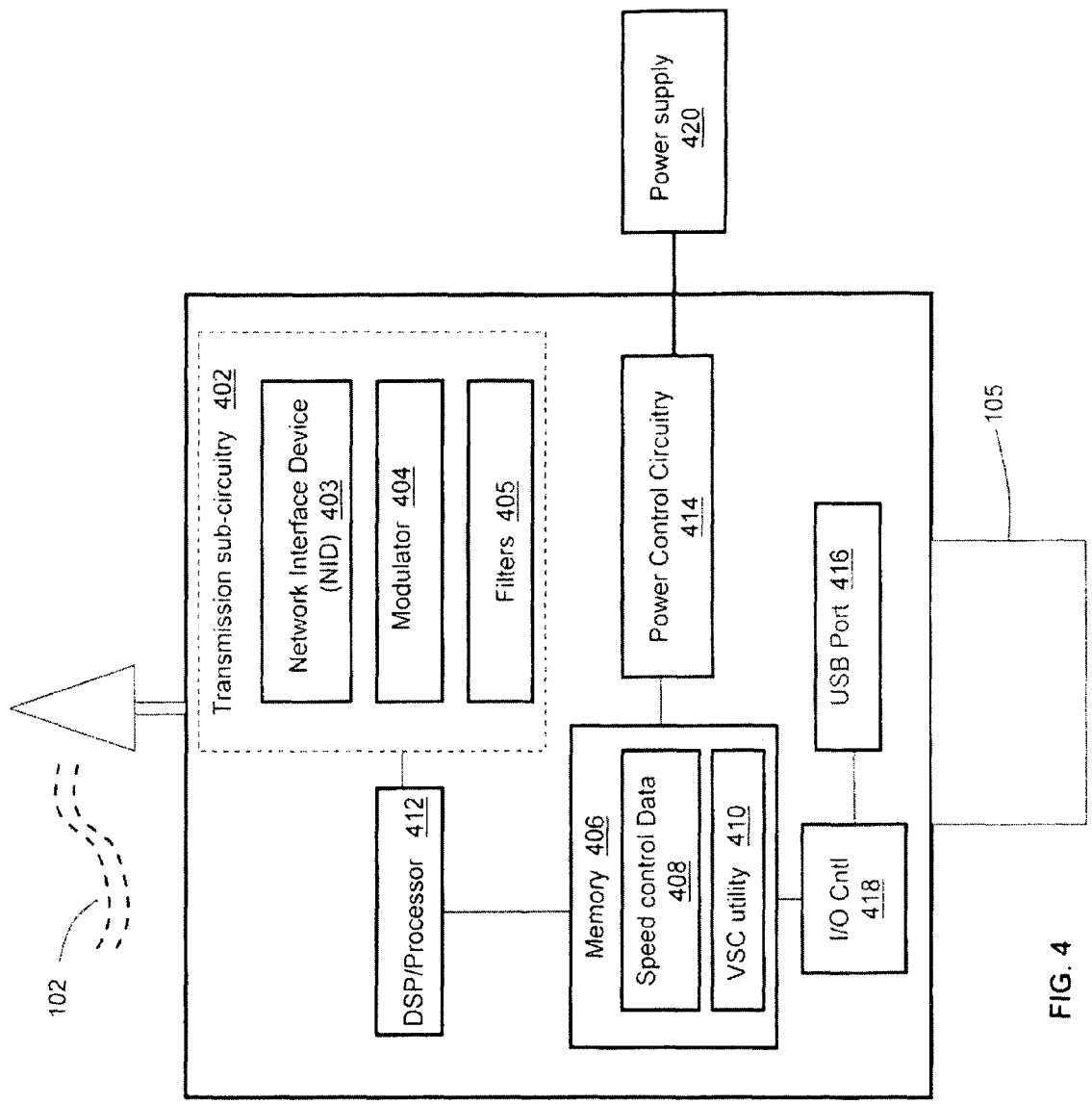
FIG. 4 illustrates a radio transmitter utilized in a speed control zone, according to one embodiment.

FIG. 4 illustrates a radio transmitter utilized in a speed control zone, according to one embodiment. Transmitter 104 utilizes antenna 401 to transmit information signal 102 to receiver 103 (explicitly shown in FIG. 1). Transmitter 104 comprises detection sub-circuitry 402 which includes Network Interface Device (NID) 403, modulator 404 and transmit filters 405. Transmitter 104 also comprises memory 406 which is coupled to DSP/Processor 412. Connected to Memory 406 is Power Control Circuitry 414. Memory 406 is also connected to I/O controller 418 which provides connectivity and control for input devices and/or output devices. In particular, I/O controller 218 is connected to USB port 416 which enables connectivity to input or output devices. Power Control Circuitry 414 is connected to Power supply 420. Transmitter 104 is physically supported and positioned by post 105. Post 105 enables an unobstructed transmission of information signal 102.

Transmitter 104 utilizes modulator 404 and filters 405 to apply modulation techniques to a binary coded representation of the speed control data and to limit the frequency bandwidth of the resulting signal, respectively. As a result, transmitter 104 is able to generate an information signal that may be wirelessly transferred to receiver 103. NID 403 facilitates the wireless transfer of information signal 102 from transmitter 104 to receiver 103. DSP/Processor 412 enables the binary coding of relevant information within speed control data 408. In addition, DSP/Processor 412 enables other processing operations required to operate transmitter 104 and generate information signal 102.

Transmitter 104 propagates information signal 102 with antenna 401 towards a receiver (e.g., receiver 103) within first signal detection zone 107. Various embodiments may utilize different types of antenna 401. In one embodiment, antenna 401 is a directional antenna and, in particular, a bi-directional antenna. Bi-directional antenna 401 enables detection of information signal 102 by a receiver positioned "ahead" of transmitter 104 or positioned "after" transmitter 104. Bi-directional antenna 401 may be used to provide an asymmetric level of signal strength on both sides of transmitter 104. For example, a strong signal propagated "ahead" of transmitter 104 (i.e., in a first direction relative to transmitter 104) and a moderate signal strength propagated "after" transmitter 104 (i.e., in a second direction relative to transmitter 104) may constitute an asymmetric propagation of signal strength. In another embodiment, a uni-directional antenna may be utilized. The uni-directional antenna propagates information signal 102 in one direction only (e.g., in the region ahead of the transmitter). In another embodiment, an omni-directional antenna (i.e., propagating in all directions) may be used when the signal range is appropriately controlled (e.g., to enable dynamic zone resizing) and the id of the transmitters is used to determine whether to accept or ignore the information signal detected by receiver 103. In one embodiment, a collection of antennas may be coupled to transmitter 104. The appropriate antenna is selected from among the collection of antennas by transmitter 104, according to the physical and/or speed characteristics of a particular speed control zone.

In one embodiment, the signal propagation range may be based on the size of antenna 401 or the amount of available power. When an adjustment of power levels may be used to provide dynamic adjustment of the signal propagation range, VSC utility 210 inspects speed control data 408 to determine which level of available power efficiently enables the required signal propagation range. VSC utility 210 utilizes Power Control Circuitry 414 to select the appropriate level of power for information signal 102.

Figure 5:
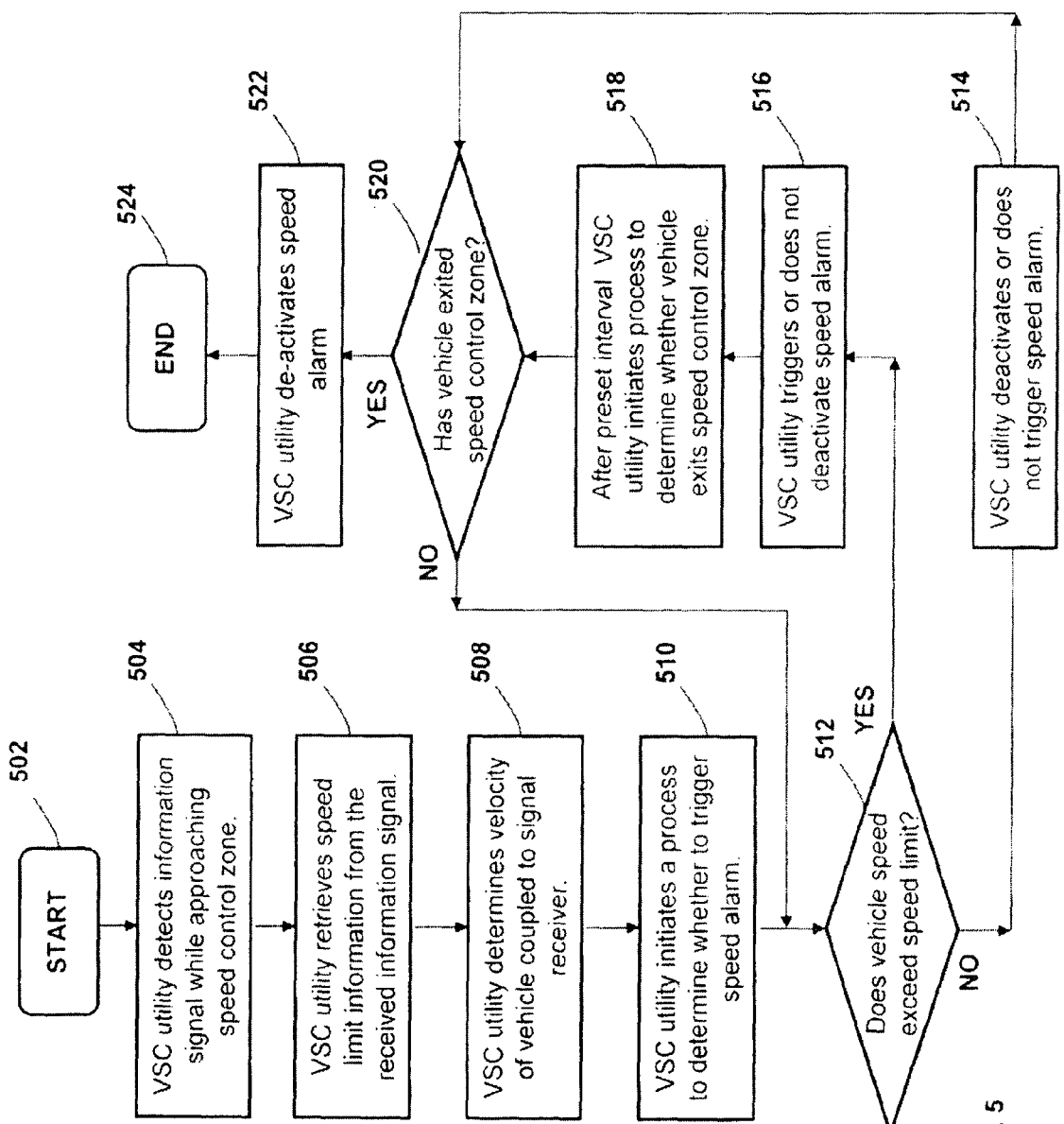
FIG. 5 is a flow chart illustrating the process of providing speed notification to the driver of a vehicle within close proximity of a speed control zone, according to one embodiment.
Figure 6:
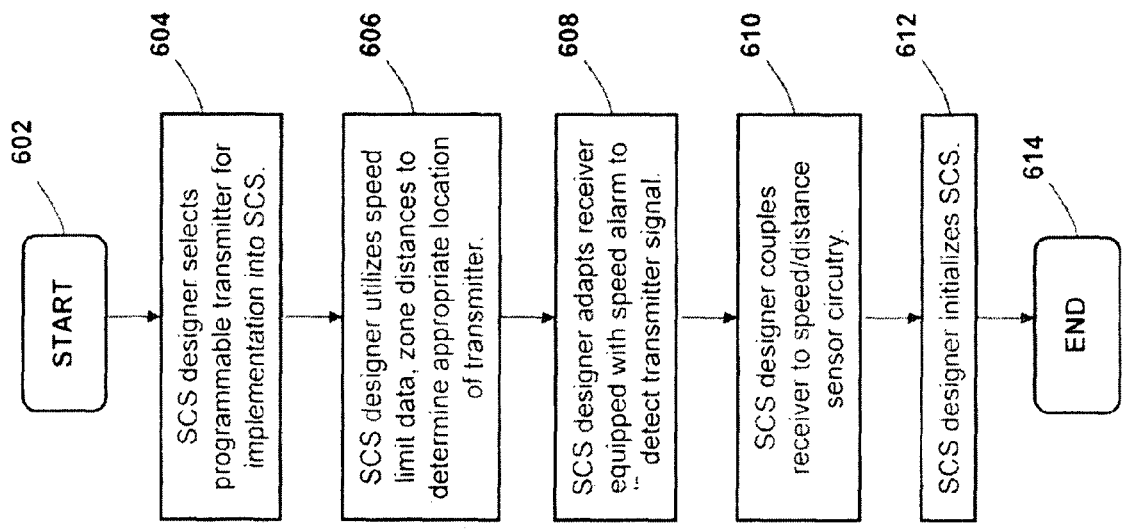
FIG. 6 is a flow chart illustrating the process of installing a transmitter and a receiver within a speed control system, according to one embodiment.

FIGS. 5-6 are flow charts illustrating various methods by which the above processes of the illustrative embodiments are completed. In particular, FIG. 5 illustrates the process of providing speed notification to the driver of a vehicle within close proximity of a speed control zone. In particular, FIG. 6 is a flow chart illustrating the process of installing a transmitter and a receiver within a speed control system. Although the methods illustrated in FIGS. 5-6 may be described with reference to components shown in FIGS. 1-4, it should be understood that this is merely for convenience and alternative components and/or configurations thereof can be employed when implementing the various methods. Key portions of the methods may be completed by VSC utility 210 executing on processor 212 within receiver 103 (FIG. 1) and controlling specific operations of/on receiver 103, and the methods are thus described from the perspective of either/both VSC utility 210 and receiver 103.

The process of FIG. 5 begins at initiator block 502 and proceeds to block 504, at which Vehicular Speed Control (VSC) utility 210 embodied within receiver 103 detects information signal 102 while approaching speed control zone 110. At block 506, VSC utility 210 retrieves speed control data 208 from information signal 102. In one embodiment, speed control data 208 includes: (a) speed limit data for speed control zone 110; (b) length of speed control zone 110; (c) length of signal detection zone 107; and (d) transmitter identification (id). VSC utility 210 determines the velocity of vehicle 101 coupled to receiver 103, as shown at block 508. At block 510, VSC utility 210 initiates a process to determine whether to trigger a speed notification alarm.

At decision block 512, VSC utility 210 determines whether the velocity of vehicle 101 exceeds the retrieved speed limit for speed control zone 110. If at block 512 VSC utility 210 determines that the velocity of vehicle 101 does not exceed the retrieved speed limit for speed control zone 110, VSC utility 210 deactivates the speed notification alarm (or does not trigger the speed notification alarm), as shown at block 514. If at block 512 VSC utility 210 determines that the velocity of vehicle 101 does exceed the retrieved speed limit for speed control zone 110, VSC utility 210 triggers the speed notification alarm (or does not deactivate the speed notification alarm), as shown at block 516. Following a preset time interval, VSC utility 210 initiates a process to determine whether vehicle 101 has exited the speed control zone, as shown at block 518.

In one embodiment, VSC utility 210 receives indication that the vehicle has exited the speed control zone based on one or more of the following: (a) a detection of a second information signal (identified by a second transmitter identification) for which the power level is greater than a threshold level, following a previous detection of the first information signal; and (b) comparisons of vehicle displacement with the length of the speed control zone and the length of the signal detection zone. In one embodiment, VSC utility 210 may select not to monitor the velocity of vehicle 101 within speed control zone 110 but may track the velocity of vehicle 101 until vehicle 101 enters speed control zone 110.

At decision block 520, VSC utility 210 determines whether the vehicle has entered the speed control zone (e.g., based on a detection of a second information signal). If at block 520 VSC utility 210 determines that vehicle 101 has exited speed control zone 110, VSC utility 210 de-activates speed notification alarm 216, as shown at block 522. If at block 520 VSC utility 210 determines that vehicle 101 has not exited speed control zone 110, VSC utility 210 returns to block 512. The process ends at block 524.

The process of FIG. 6 begins at initiator block 602 and proceeds to block 604, at which a Speed Control System (SCS) designer selects programmable radio transmitter 104 to be integrated into SCS 100. At block 606, the SCS designer utilizes speed limit data for speed control zone 110 and zone lengths/distances to determine appropriate placement of transmitter 104. The SCS designer adapts receiver 103 which is equipped with speed notification alarm (facility) 216 to detect information signal 102, as shown at block 608. At block 610, the SCS designer electrically couples receiver 103 to speed/distance sensor circuitry 228. The SCS designer initializes SCS 100, as shown at block 612. The process ends at block 614.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a vehicular speed control system having a radio receiver, wherein said receiver is adapted to receive information signals from at least one radio transmitter a method comprising:
    detecting an information signal transmitted by a first radio transmitter;
    retrieving from the information signal one or more of: (a) indication of a speed limit of a speed control zone; (b) driving distance of the speed control zone; and (c) driving distance of a first signal detection zone;
    recording one or more of: (a) a time of an initial detection of said information signal; (b) a first identification (id) of said first transmitter; and (c) a corresponding odometer reading using displacement detection circuitry in said vehicular speed control system, at the time of said initial detection;
    determining a first velocity of a vehicle coupled to the receiver, wherein said receiver detects the information signal;
    determining whether to activate a speed notification alarm, wherein determining whether to activate a speed notification alarm further comprises: comparing said speed limit with said first velocity; when said first velocity is greater than said speed limit, activating the speed notification alarm; and when said first velocity is not greater than said speed limit, maintaining a de-activated state of said speed notification alarm;
    obtaining indication of an arrival of said vehicle at an entrance of the speed control zone,
    wherein said obtaining further comprises receiving an indication that said vehicle advances beyond the entrance of said speed control zone from one or more of: (a) detection of a sub-threshold power level of said information signal, wherein said power level is measured at one or more pre-set time intervals; (b) vehicle displacement measured by odometer readings; and (c) comparisons of vehicle displacement with the length of the speed control zone and the length of the signal detection zone;
    when said vehicle advances beyond the entrance of said speed control zone, recording a time corresponding to receipt of a first indication that said vehicle advances beyond the entrance of said speed control zone;
    determining a current velocity of said vehicle, when said vehicle has not arrived at one of: (a) the entrance of said speed control zone; and (b) an exit of a said speed control zone;
    when said current velocity is greater than said speed limit: (a) activating a speed notification alarm; or (b) maintaining an activated state of said speed notification alarm; and
    when said current velocity is not greater than said speed limit: (a) deactivating said speed notification alarm; or (b) maintaining a de-activated state of said speed notification alarm.

2. The method of claim 1, further comprising:
    determining whether said vehicle advances beyond an exit of said speed control zone by one or more of: (a) detection of a second information signal which is transmitted by a second transmitter identified by a second transmitter identification, wherein said second transmitter identification is different from said first transmitter id; (b) vehicle displacement measured by odometer readings; and (c) comparisons of vehicle displacement with the length of the speed control zone and the length of the signal detection zone; and
    following an advance of said vehicle past the exit of said speed control zone and beyond a second signal detection zone, replacing retrieved information by preset reset values.

3. The method of claim 1, wherein said activating further comprises:
    providing a warning by one or more of: (a) an audible notification; and (b) a visible notification;
    issuing said audible notification using one or more of: (a) a buzzing sound; (b) a voice message; and (c) other suitable audible notification;
    displaying said visual notification using one or more of: (a) text or graphics on a display panel; (b) flashing of text; and (c) other highlight feature to focus attention on the warning;
    wherein said warning indicates to the driver of said vehicle that said vehicle is within close proximity of the speed control zone and the current speed of said vehicle exceeds said speed limit of said speed control zone;
    publishing a notification using one or more of: (a) a dedicated display or audio component of the speed notification alarm; (b) a shared display component or shared audio component to which speed notification alarm connects via a wired or wireless network connection; and
    wherein said receiver is equipped with transmitter functionality to transfer data to a separate device, wherein said separate device is selected from among a plurality of devices including: (a) a stereo radio system having a display.

4. A computer program product comprising:
    a non-transitory computer readable medium; and
    program code on said non-transitory computer readable medium that when executed within a data processing device, said program code provides the functionality of:
    detecting an information signal transmitted by a first radio transmitter;
    retrieving from the information signal one or more of: (a) indication of a speed limit of a speed control zone; (b)

driving distance of the speed control zone; and (c) driving distance of a first signal detection zone;

recording one or more of: (a) a time of an initial detection of said information signal; (b) a first identification (id) of said first transmitter; and (c) a corresponding odometer reading using displacement detection circuitry in said vehicular speed control system, at the time of said initial detection;

determining a first velocity of a vehicle coupled to the receiver, wherein said receiver detects the information signal;

determining whether to activate a speed notification alarm, wherein said program code for determining whether to activate a speed notification alarm further comprises program code for: comparing said seed limit with said first velocity when said first velocity is greater than said speed limit, activating the speed notification alarm; and when said first velocity is not greater than said speed limit, maintaining a de-activated state of said speed notification alarm;

obtaining indication of an arrival of said vehicle at an entrance of the speed control zone; wherein said program code for obtaining indication of an arrival of said vehicle at an entrance of the speed control zone further comprises program code for:

receiving an indication that said vehicle advances beyond the entrance of said speed control zone from one or more of: (a) detection of a sub-threshold power level of said information signal, wherein said power level is measured at one or more pre-set time intervals; (b) vehicle displacement measured by odometer readings; and (c) comparisons of vehicle displacement with the length of the speed control zone and the length of the signal detection zone;

when said vehicle advances beyond the entrance of said speed control zone, recording a time corresponding to receipt of a first indication that said vehicle advances beyond the entrance of said speed control zone;

determining a current velocity of said vehicle, when said vehicle has not arrived at one of: (a) the entrance of said speed control zone; and (b) an exit of a said speed control zone;

when said current velocity is greater than said speed limit: (a) activating a speed notification alarm; or (b) maintaining an activated state of said speed notification alarm; and when said current velocity is not greater than said speed limit (a) deactivating said speed notification alarm; or (b) maintaining a de-activated state of said speed notification alarm.

5. The computer program product of claim 4, further comprising program code for:

determining whether said vehicle advances beyond an exit of said speed control zone by one or more of: (a) detection of a second information signal which is transmitted by a second transmitter identified by a second transmitter identification, wherein said second transmitter identification is different from said first transmitter id; (b) vehicle displacement measured by odometer readings; and (c) comparisons of vehicle displacement with the length of the speed control zone and the length of the signal detection zone; and following an advance of said vehicle past the exit of said speed control zone and beyond a second signal detection zone, replacing retrieved information by preset reset values.

6. The computer program product of claim 4, wherein said program code for activating further comprises program code for:

providing a warning by one or more of: (a) an audible notification; and (b) a visible notification;

issuing said audible notification using one or more of: (a) a buzzing sound; (b) a voice message; and (c) other suitable audible notification;

displaying said visual notification using one or more of: (a) text or graphics on a display panel; (b) flashing of text; and (c) other highlight feature to focus attention on the warning;

wherein said warning indicates to the driver of said vehicle that said vehicle is within close proximity of the speed control zone and the current speed of said vehicle exceeds said speed limit of said speed control zone;

publishing a notification using one or more of: (a) a dedicated display or audio component of the speed notification alarm; (b) a shared display component or shared audio component to which speed notification alarm connects via a wired or wireless network connection; and wherein said receiver is equipped with transmitter functionality to transfer data to a separate device, wherein said separate device is selected from among a plurality of devices including: (a) a stereo radio system having a display.

7. A vehicular speed control system comprising:

a transmitter for transmitting an information signal, said information signal comprises one or more of: (a) indication of a speed limit; (b) length of a speed control zone; and (c) length of a first signal detection zone;

wherein said transmitter is physically supported at a position which is located at a particular distance from an entrance of a speed control zone;

wherein said particular distance enables an approaching vehicle to decelerate from a pre-determined maximum speed to a pre-determined speed limit within a preset interval of time;

wherein said transmitter is programmable and said transmitter is pre-programmed with information indicating a set of days of operation and a collection of operating time limits, according to a schedule of operation; and wherein said transmitter transmits the information signal according to the schedule of operation;

a receiver physically coupled to a vehicle, said receiver detecting an information signal transmitted by said transmitter and said receiver is electrically coupled to an electrical speed sensor circuitry of said vehicle;

said receiver further comprising, a speed alarm and notification facility, a processor, a discrete signal processor (DSP), a memory and a utility which when executed on said processor provides the functions of:

detecting an information signal transmitted by a first radio transmitter;

retrieving from the information signal one or more of: (a) indication of a speed limit of a speed control zone; (b) driving distance of the speed control zone; and (c) driving distance of a first signal detection zone;

recording one or more of: (a) a time of an initial detection of said information signal; (b) a first identification (id) of said first transmitter; and (c) a corresponding odometer reading using displacement detection circuitry in said vehicular speed control system, at the time of said initial detection;

determining a first velocity of a vehicle coupled to the receiver, wherein said receiver detects the information signal;

determining whether to activate a speed notification alarm, wherein said functions for determining whether to activate a speed notification alarm further comprises functions for: comparing said speed limit with said first velocity; when said first velocity is greater than said speed limit, activating the speed notification alarm; and when said first velocity is not greater than said speed limit, maintaining a de-activated state of said speed notification alarm; and obtaining indication of an arrival of said vehicle at an entrance of the speed control zone, wherein said functions for obtaining indication of an arrival of said vehicle as an entrance of the speed control zone further comprises functions for receiving an indication that said vehicle advances beyond the entrance of said speed control zone from one or more of: (a) detection of a sub-threshold power level of said information signal, wherein said power level is measured at one or more pre-set time intervals; (b) vehicle displacement measured by odometer readings; and (c) comparisons of vehicle displacement with the length of the speed control zone and the length of the signal detection zone;

when said vehicle advances beyond the entrance of said speed control zone, recording a time corresponding to receipt of a first indication that said vehicle advances beyond the entrance of said speed control zone;

determining a current velocity of said vehicle, when said vehicle has not arrived at one of: (a) the entrance of said speed control zone; and (b) an exit of a said speed control zone;

when said current velocity is greater than said speed limit: (a) activating a speed notification alarm; or (b) maintaining an activated state of said speed notification alarm; and when said current velocity is not greater than said speed limit: (a) deactivating said speed notification alarm; or (b) maintaining a de-activated state of said speed notification alarm.

8. The vehicular speed control system of claim 7:

wherein said transmitter has a directional radio antenna, wherein said antenna directs said information signal exclusively towards vehicles moving along a specific segment of a route towards said speed control zone, wherein said vehicles are able to detect the information signal from within a preset range of distances from said speed control zone;

wherein said transmitter has a power control circuitry, wherein said power control circuitry enables an adjustment of signal power of said information signal;

wherein said transmitter has a antenna selection circuitry, wherein said antenna selection circuitry enables a selection of a single antenna from among a collection of transmitter antennas, wherein said single antenna is different from a default antenna;

wherein said collection of transmitter antennas includes one or more of: (a) bi-directional antennas; (b) uni-directional antennas; and (c) omni-directional antennas;

wherein said transmitter electronically enables a dynamic zone resizing of one or more of: (a) the speed control zone; (b) the first signal detection zone; and (c) a second signal detection zone;

wherein the adjustment of signal power enables a first amount of the dynamic zone resizing; and wherein the selection of the single antenna enables one or more of: (a) a second amount of the dynamic zone resizing; and (b) dynamic adjustment of signal directivity.

9. The vehicular speed control system of claim 7, further comprising functions for:

determining whether said vehicle advances beyond an exit of said speed control zone by one or more of: (a) detection of a second information signal which is transmitted by a second transmitter identified by a second transmitter identification, wherein said second transmitter identification is different from said first transmitter id; (b) vehicle displacement measured by odometer readings; and (c) comparisons of vehicle displacement with the length of the speed control zone and the length of the signal detection zone; and following an advance of said vehicle past the exit of said speed control zone and beyond a second signal detection zone, replacing retrieved information by preset reset values.

10. The vehicular speed control system of claim 7, wherein said functions for activating further comprises functions for:

providing a warning by one or more of: (a) an audible notification; and (b) a visible notification;

issuing said audible notification using one or more of: (a) a buzzing sound; (b) a voice message; and (c) other suitable audible notification;

displaying said visual notification using one or more of: (a) text or graphics on a display panel; (b) flashing of text; and (c) other highlight feature to focus attention on the warning;

wherein said warning indicates to the driver of said vehicle that said vehicle is within close proximity of the speed control zone and the current speed of said vehicle exceeds said speed limit of said speed control zone;

publishing a notification using one or more of: (a) a dedicated display or audio component of the speed notification alarm; (b) a shared display component or shared audio component to which speed notification alarm connects via a wired or wireless network connection; and wherein said receiver is equipped with transmitter functionality to transfer data to a separate device, wherein said separate device is selected from among a plurality of devices including: (a) a stereo radio system having a display.

* * * * *